(12) United States Patent
Zirilli

(10) Patent No.: US 10,508,803 B2
(45) Date of Patent: Dec. 17, 2019

(54) SYNTHETIC JETS TO COOL DIGITAL MICROMIRROR DEVICES

(71) Applicant: Xerox Corporation, Norwalk, CT (US)

(72) Inventor: Francisco Zirilli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/889,813

(22) Filed: Feb. 6, 2018

(65) Prior Publication Data

US 2019/0242566 A1   Aug. 8, 2019

(51) Int. Cl.

| F21V 29/505 | (2015.01) |
|---|---|
| F21V 29/60 | (2015.01) |
| G02B 26/08 | (2006.01) |
| G02B 7/18 | (2006.01) |
| H04N 9/31 | (2006.01) |

(52) U.S. Cl.
CPC ............ *F21V 29/505* (2015.01); *F21V 29/60* (2015.01); *G02B 26/0833* (2013.01); *G02B 7/1815* (2013.01); *H04N 9/3144* (2013.01)

(58) Field of Classification Search
CPC ..... F21V 29/505; F21V 29/60; G02B 7/1815; G02B 7/181–182; G02B 26/0833; B41J 2/435; H01S 3/0401; H04N 9/3144
USPC .......................................................... 361/691
See application file for complete search history.

(56) References Cited

U.S. PATENT DOCUMENTS

| 5,083,194 A | 1/1992 | Bartilson |
|---|---|---|
| 7,079,393 B2 | 7/2006 | Colgan et al. |
| 7,362,574 B2 | 4/2008 | Campbell et al. |
| 9,252,069 B2 | 2/2016 | Bhunia et al. |
| 2002/0167976 A1* | 11/2002 | Seguin .................. H01S 3/0315 372/34 |
| 2005/0185244 A1* | 8/2005 | Fujimori ........... G02F 1/133385 359/237 |
| 2007/0206158 A1* | 9/2007 | Kinoshita .............. G03B 21/16 353/52 |
| 2008/0002363 A1 | 1/2008 | Campbell et al. |
| 2009/0219686 A1* | 9/2009 | Ishikawa ................... F04F 7/00 361/692 |
| 2010/0053891 A1* | 3/2010 | Arik ...................... H01L 23/467 361/692 |

(Continued)

OTHER PUBLICATIONS

Jayaraman, S., "Micro Scale Impingement Cooling and its Efficacy on Turbine Vanes, A Numerical Study", Ryerson University MEng Thesis, Toronto, Ontario, 2013, 60 pp.

(Continued)

*Primary Examiner* — Dion Ferguson
*Assistant Examiner* — Amir A Jalali

(57) ABSTRACT

An apparatus and a method for cooling a digital micromirror device are disclosed. For example, the apparatus includes a digital micromirror device (DMD), a housing coupled to the DMD, wherein a first side of the housing is coupled to a bottom of the DMD and a cooling block coupled to a second side of the housing that is opposite the first side. The cooling block includes a plate that includes a plurality of openings, a diaphragm coupled to the plate, an air inlet to generate an airflow across the plate, wherein the diaphragm creates a force to move the airflow in a direction that is perpendicular to a direction of the airflow towards the second side of the housing, and an air outlet to collect the airflow.

20 Claims, 7 Drawing Sheets

(56) References Cited

U.S. PATENT DOCUMENTS

| | | | | |
|---|---|---|---|---|
| 2011/0259557 A1* | 10/2011 | Chao | ............... | F04B 43/046 |
| | | | | 165/121 |
| 2012/0181360 A1* | 7/2012 | Darbin | ............... | B64C 23/04 |
| | | | | 239/589 |
| 2014/0299674 A1* | 10/2014 | Uibel | ............... | H01L 23/4735 |
| | | | | 239/102.2 |
| 2014/0376185 A1* | 12/2014 | Lee | ............... | H01L 23/467 |
| | | | | 361/694 |
| 2017/0094834 A1* | 3/2017 | Fricker | ............... | F04D 33/00 |
| 2018/0039308 A1* | 2/2018 | Moore | ............... | G06F 1/203 |
| 2018/0190618 A1* | 7/2018 | Mo | ............... | H01L 23/4336 |
| 2018/0240734 A1* | 8/2018 | Liao | ............... | H01L 23/467 |
| 2018/0261967 A1* | 9/2018 | Filgas | ............... | G02B 6/4204 |

OTHER PUBLICATIONS

Umair Arif, et al., Feasibility Study of using Nozzles for Air Cooling in Air Cooling System', International Journal of Innovative Research in Science, Engineering and Technology, vol. 6, Issue 7, Jul. 2017, 4 pp.

Phalnikar, K.A., et al., "Behavior of Free and Impinging Supersonic Microjets", AIAA 2001-3047, 31st AIAA Fluid Dynamics Conference and Exhibit, Jun. 11-14, 2001, Anaheim, CA, pp. 1-15.

* cited by examiner

SYNTHETIC JETS TO COOL DIGITAL MICROMIRROR DEVICES

The present disclosure relates generally to printers and optical components within certain laser imaging modules and, more particularly, to an apparatus and method for cooling a digital micromirror device using synthetic jets.

BACKGROUND

Some printers or imaging devices use a laser imaging module (LIM). The LIM may include one or more lasers that work with one or more optical components to re-direct the laser to a print medium to print an image. During operation, the optical components can absorb a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

SUMMARY

According to aspects illustrated herein, there are provided an apparatus and a method for cooling a digital micromirror device. One disclosed feature of the embodiments is a laser imaging module that comprises a digital micromirror device (DMD), a housing coupled to the DMD, wherein a first side of the housing is coupled to a bottom of the DMD and a cooling block coupled to a second side of the housing that is opposite the first side. The cooling block includes a plate that includes a plurality of openings, a diaphragm coupled to the plate, an air inlet to generate an airflow across the plate, wherein the diaphragm creates a force to move the airflow in a direction that is perpendicular to a direction of the airflow towards the second side of the housing, and an air outlet to collect the airflow.

Another disclosed feature of the embodiments is a method for cooling the DMD. In one embodiment, the method comprises measuring a temperature of the DMD, determining that the temperature of the DMD is above a threshold, and providing an airflow through a cooling block comprising a plate having a plurality of openings, a diaphragm coupled to the plate, an air inlet that generates the airflow across the plate, wherein the diaphragm creates a force to move the airflow in a direction that is perpendicular to a direction of the airflow towards the DMD, and an air outlet to collect the airflow.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for cooling a digital micromirror device (DMD). As discussed above, some printers or imaging devices use a laser imaging module (LIM). The LIM may include one or more lasers that work with one or more optical components to re-direct the laser to a print medium to print an image. During operation, the optical components can absorb a large amount of heat due to the amount of power used by the lasers within the LIM.

Large amounts of heat can negatively affect the optical components. For example, large amounts of heat can cause the optical components to operate improperly, operate with a reduced life expectancy, or in extreme instances, cause the optical components to completely fail. Currently used methods may be inefficient in cooling the optical components to a proper temperature range.

A DMD presents further challenges to properly cool the DMD due to high heat fluxes involved. Due to how the DMD is mounted on an electrical board, the amount of space available for effective cooling is very limited.

Embodiments of the present disclosure provide a novel apparatus and method that provides a higher heat transfer rate in a cooling block than previous designs. In addition, some embodiments the cooling block may generate synthetic jets to further increase the heat transfer rate and provide more efficient cooling of the DMD.

Figure 1:
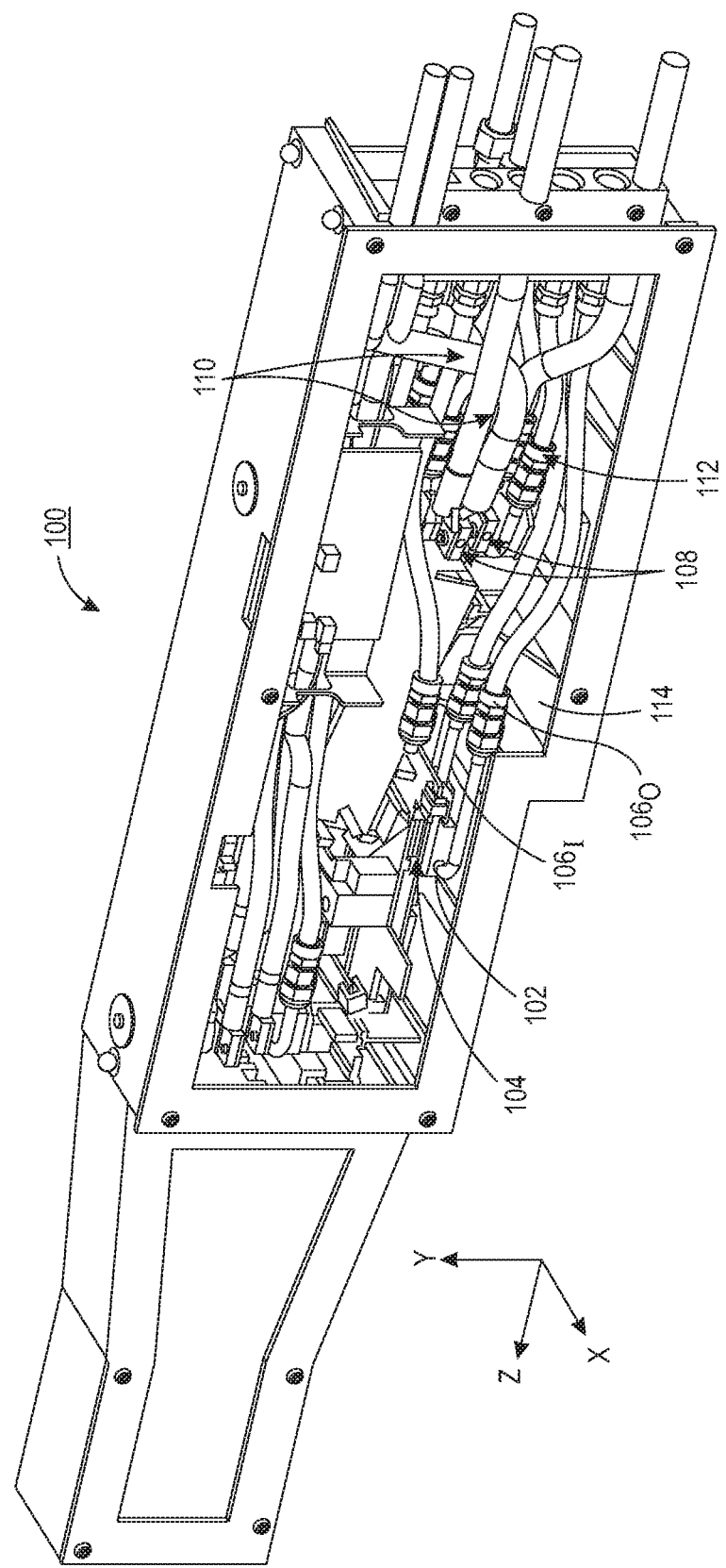
FIG. 1 illustrates an example laser imaging module (LIM) of the present disclosure within a laser imaging module.

FIG. 1 illustrates an example laser imaging module (LIM) or apparatus 100 of the present disclosure. In one embodiment, the LIM 100 may be part of an imaging device or printer. In one embodiment, the LIM 100 may include one or more laser diodes 108 that emit lasers that are redirected by a digital micromirror device (DMD) 104 onto a print medium (e.g., paper, plastic, fabric, and the like). The laser diodes 108 may be connected to a processor, a power source, and the like via one or more electrical connections 110.

In one embodiment, the laser diodes 108 may be powered by a large amount of power. For example, the laser diodes 108 may be powered by as much as 360 Watts of energy and a significant amount of this energy, typically ranging from 40 to 60 Watts, may be absorbed by the DMD. In one embodiment, the laser diodes 108 may be cooled by one or more cooling lines 112.

In one embodiment, the DMD 104 may comprise arrays of small mirrors that are used to redirect the laser, or light, emitted by the laser diodes 108. During operation the large amount of energy of the light emitted by the laser diodes 108 can cause the DMD 104 to rise in temperature. High temperatures can cause damage to the DMD 104 or complete failure. For example, temperatures above 70 degrees Celsius (° C.) can cause the life of the DMD 104 to degrade. Temperatures above 120° C. can cause damage to the DMD 104 or cause the DMD 104 to fail.

As noted above, the DMD 104 may present challenges to properly cool the DMD 104 due to high heat fluxes involved. The amount of space available for effective cooling is very limited due to how the DMD 104 is mounted to the electrical board.

One embodiment of the present disclosure provides a cooling block 102 that is designed to efficiently cool the DMD 104. The cooling block 102 may use a coolant that is moved through the cooling block 102 via an inlet cooling line 106$_I$ and an outlet cooling line 106$_O$. The inlet cooling line 106$_I$ and the outlet cooling line 106$_O$ may also be referred to herein collectively as cooling line or lines 106.

In one embodiment, the cooling block 102 and the cooling lines 106 may comprise a metal. For example, the cooling block 102 and the cooling lines 106 may be fabricated from copper or another similar conductive metal.

In one embodiment, the coolant may be a fluid that is used to transfer heat away from the DMD 104. In one example, the fluid may be air. The air may be cooled and flowed through the cooling block 102, as described in further detail below to cool the DMD 104.

In one embodiment, a temperature sensing device 114 may be coupled, directly or indirectly, to cooling block 102 and/or the DMD 104. The temperature sensing device 114 may be a thermistor wire, a thermocouple, or any other type of temperature sensing device.

The temperature sensing device 114 may measure the temperature of the DMD 104. Based on the temperature, a processor or controller, may release, or move, the coolant through the cooling line 106 and the cooling block 102. For example, when the temperature measured by the thermistor wire 114 rises above a temperature threshold (e.g., 70° C., 120° C., and the like), the coolant may be moved through the cooling block 102 to lower, and maintain, the temperature back below the threshold temperature. In another example, the temperature sensing device 114 may be used to send feedback to the processor or controller such that the processor could send a command to a chiller and change an inlet coolant temperature.

Figure 2:
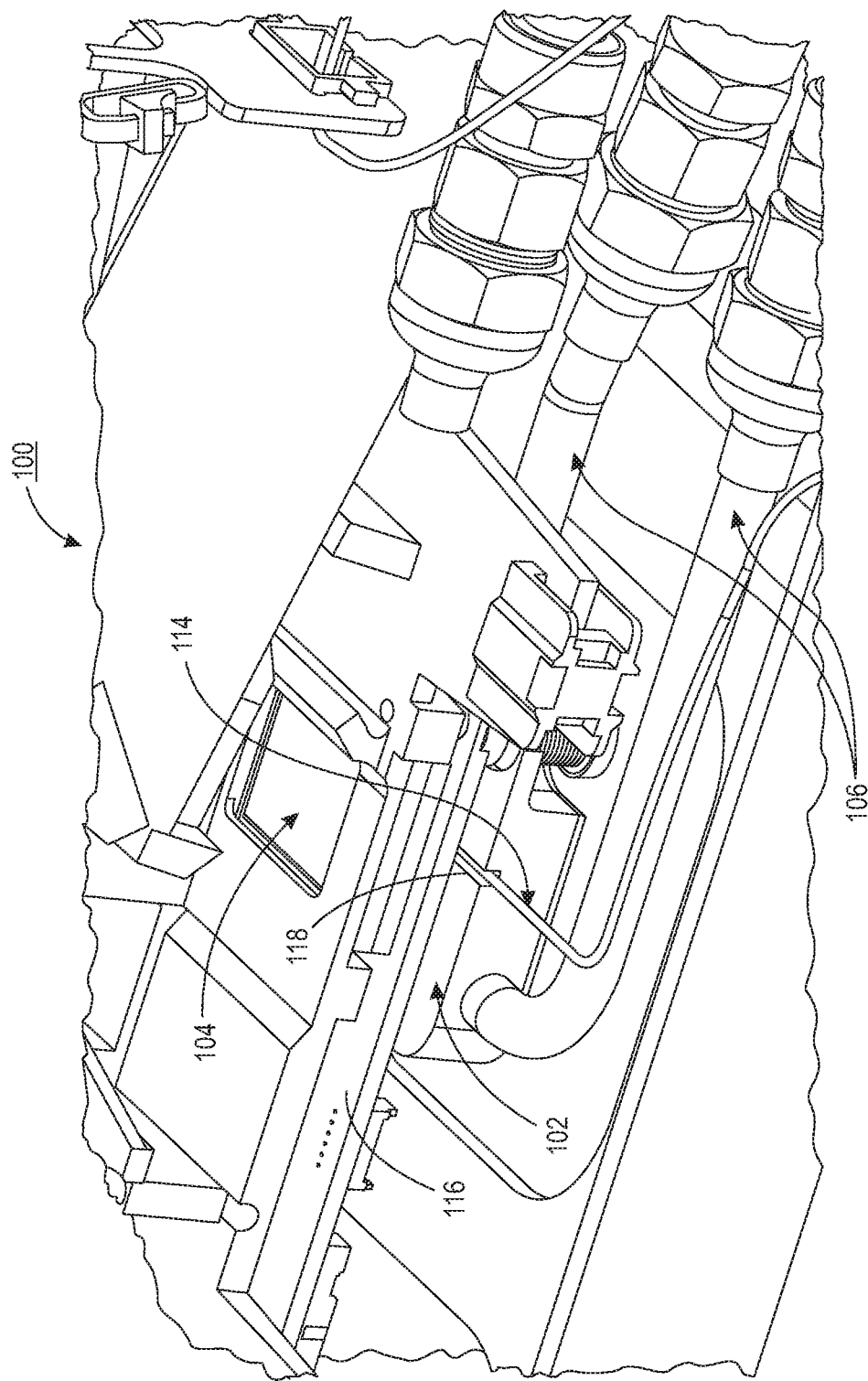
FIG. 2 illustrates a close-up view of an example cooling block within the LIM of the present disclosure.

FIG. 2 illustrates a more detailed view of the cooling block 102 and how it is positioned within the LIM 100. Some components from FIG. 1 have been removed in FIG. 2 to show in greater detail how the DMD 104 is positioned on an electrical board 116 and on the cooling block 102. In one embodiment, the cooling block 102 may include a cut out or groove 118 that holds the temperature sensing device 114.

Although the cooling lines 106 are shown as being run laterally or horizontally into the cooling block 102, it should be noted that the cooling lines 106 may be run vertically into the cooling block 102. For example, the cooling lines 106 may be located below the cooling block 102 and enter from a bottom side of the cooling block 102 rather than the lateral sides of the cooling block 102. Running the cooling lines 106 vertically may help remove some turns that may help reduce the overall pressure drop within the cooling lines 106. Overall, removing as many turns as possible may help reduce the overall pressure within the cooling lines 106 whether the cooling lines 106 are run horizontally or vertically into the cooling block 102. In addition, the cooling lines 106 may be able to deliver, or move, the coolant through the cooling block 102 at a greater velocity, or with more turbulent flow.

Figure 3:
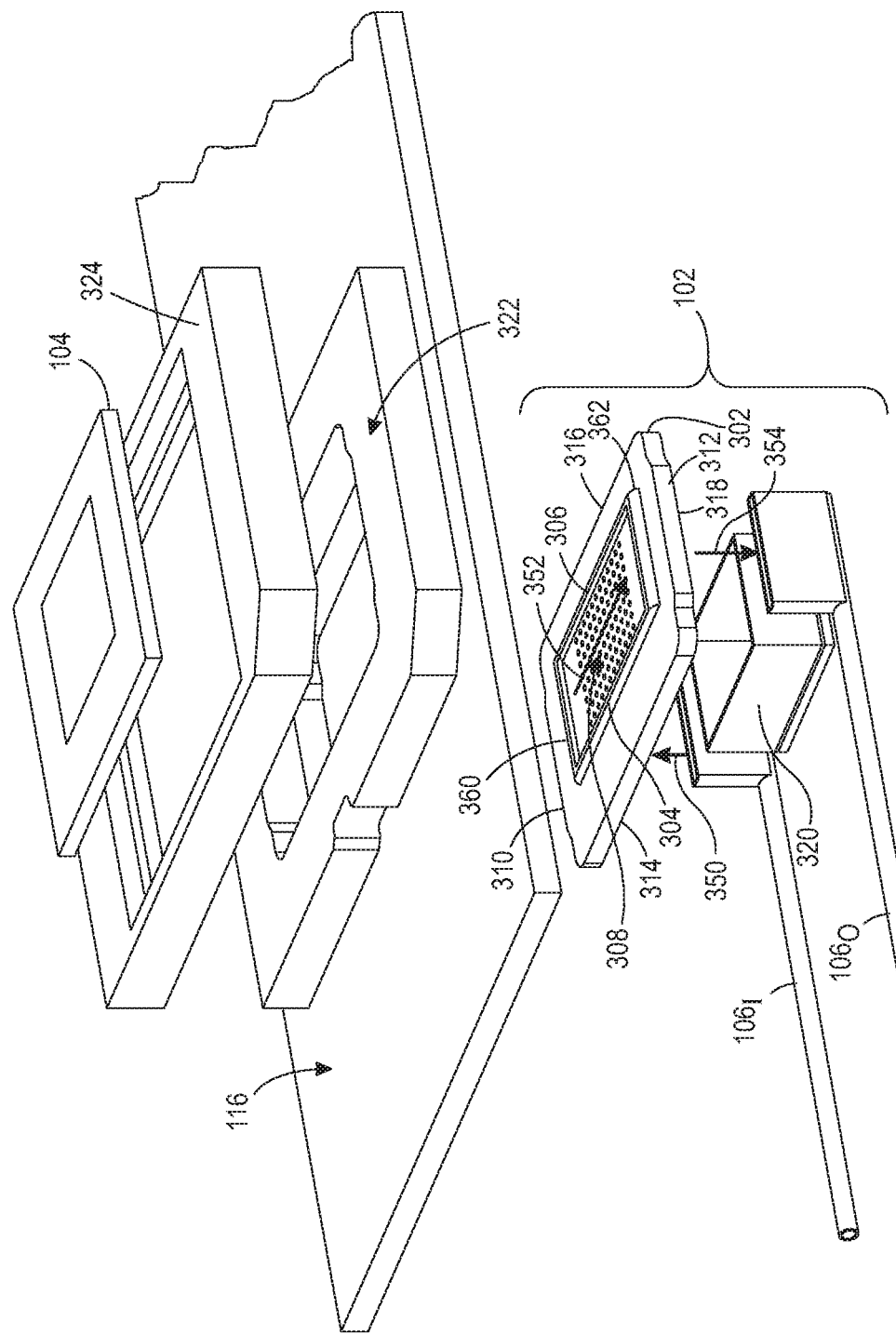
FIG. 3 illustrates an exploded view of an example arrangement of the cooling block of the present disclosure.

FIG. 3 illustrates an exploded view of an example arrangement of the cooling block 102 of the present disclosure. In one embodiment, the DMD 104 may be coupled to a housing 324 that is coupled to a socket 322. The electrical board 116 may have an opening that corresponds to an opening of the socket 322. The opening may allow air to contact the housing 324 that is coupled to the DMD 104.

In one embodiment, the cooling block 102 may include a plate 302 having a plurality of openings 308. Each one of the plurality of openings 308 may have an opening diameter of approximately 25 microns to 100 microns.

In one embodiment, the plate 302 may have a rectangular or square shape. The plate 302 may have a first end 310, a second end 312 that is opposite the first end 310, a third end 314, and a fourth end 316 that is opposite the third end 314.

In one embodiment, an air inlet 360 may be coupled to the first end 310, or adjacent to the first end 310. In one embodiment, an air outlet 362 may be coupled to the second end 312. The cooling line 106$_I$ may provide airflow up through the air inlet as shown by an arrow 350. The airflow may move across a top side of the plate 302 in a direction as shown by an arrow 352. The airflow may then be collected by the air outlet 362 and moved down into the cooling outlet 106$_O$ as shown by an arrow 354.

The airflow may be continuous or may be turned on and off as the cooling block 102 is activated or deactivated based on a temperature of the DMD 104. In one embodiment, the airflow may be moved at a velocity of approximately 0.5 meters per second (m/s) to 2 m/s.

In one embodiment, an airflow guide 304 may be coupled adjacent to the third end 314 and an airflow guide 306 may be coupled adjacent to a fourth end 316. In other words, the airflow guides 304 and 306 may be positioned on opposite sides of the plate 302. In addition, the airflow guides 304 and 306 may be perpendicularly positioned relative to the air inlet 360 and the air outlet 362.

In one embodiment, the air inlet 360, the air outlet 362, and the airflow guides 304 and 306 may be coupled to a bottom of the electrical board 116 and around the opening of the electrical board 116. As a result, the air inlet 360, the air outlet 362, and the airflow guides 304 and 306 contain the airflow and ensure that the airflow is moved from the air inlet 360 across a length of the plate 302 as shown by the arrow 352 and into the air outlet 362.

In one embodiment, the cooling block 102 may also include a diaphragm 320 that is coupled to a bottom side 318 of the plate 302. The diaphragm 320 may create a force that moves the airflow towards the DMD 104. In other words, the force created by the diaphragm 320 may move the airflow in a direction that is perpendicular to the direction of the airflow towards the bottom side (or second side) of the housing 324.

Figure 4:
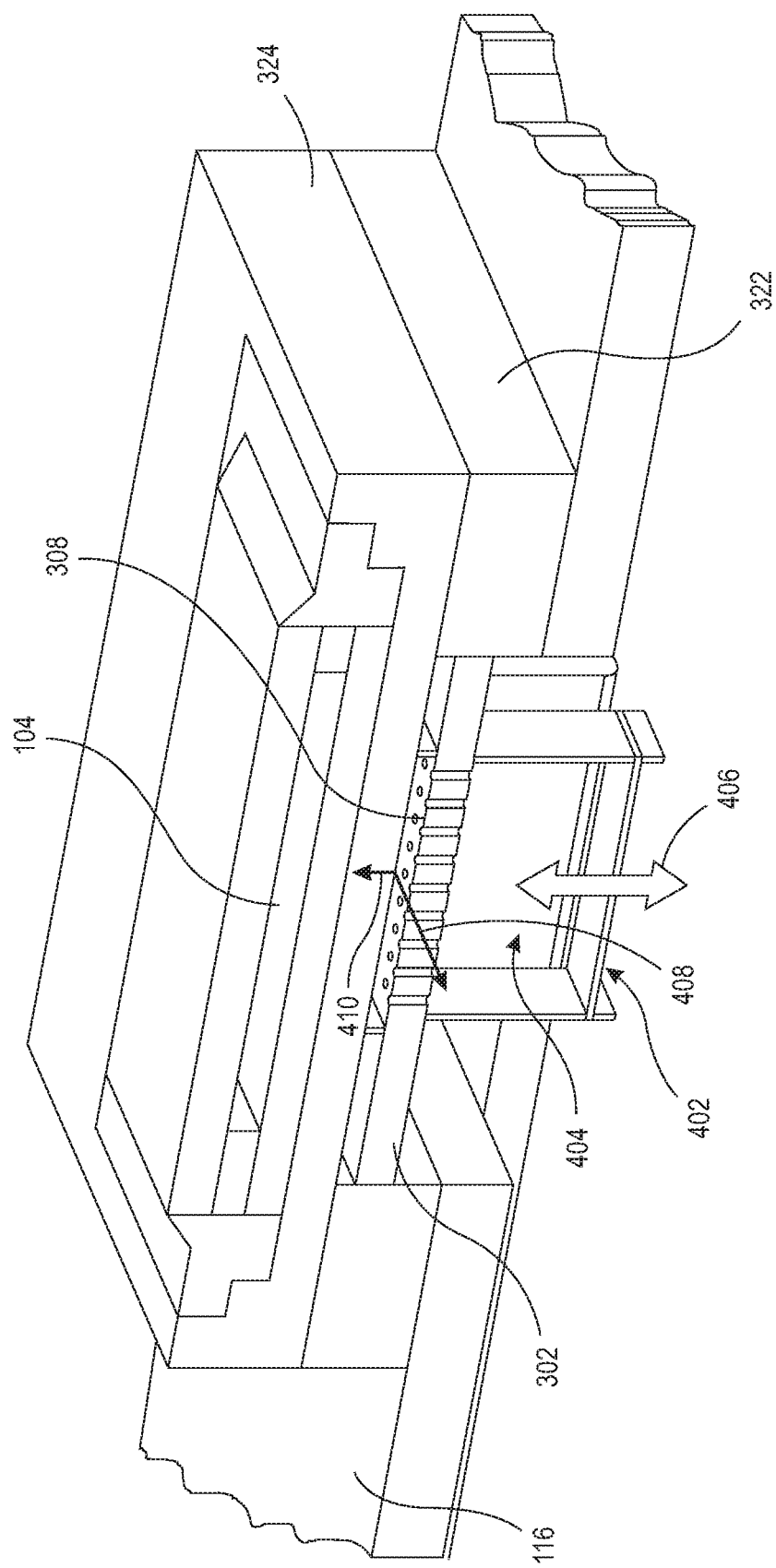
FIG. 4 illustrates a cross sectional view of the example cooling block of the present disclosure.

FIG. 4 illustrates a cross sectional view of the example cooling block 102 of the present disclosure. FIG. 4 illustrates a volume 404 created by the walls of the diaphragm 320 and a movable floor 402. In one embodiment, the movable floor 402 may oscillate up and down as shown by an arrow 406. The movable floor 402 may move up to force air or fluid through the plurality of holes 308 of the plate 302. The force created by the movable floor 402 moving up towards the plate 302 may create synthetic jets by air moving at a higher velocity as it is forced through the plurality of holes 308. The air moving towards the plate 302 may cause the airflow moving in a direction 352 illustrated in FIG. 3 to move closer (as shown by an arrow 410) to the housing 324 that is coupled to the DMD 104 as the airflow is moving laterally (as shown by an arrow 408).

In one embodiment, the airflow may move in the direction 352 in a wave form as the moving floor 402 oscillates up and down. The oscillation of the moving floor 402 may cause the airflow moving in the direction 352 to also rise towards the housing 324, and fall away from the housing 324 in a wave pattern. The wave pattern of movement caused by the force created by the diaphragm 320 can increase the heat transfer of the airflow moving across the plate 302 and against the housing 324/DMD 104.

In one embodiment, the moving floor 402 may move at a pre-defined frequency. In one embodiment, the frequency may be a range of approximately 30 hertz to 10 kilohertz. In one embodiment, the movable floor 402 may move approximately 1-2 millimeters up and down in the direction indicated by the arrow 406. In other words, the volume may have a height (e.g., a distance between a bottom of the plate 302 to a top of the movable floor 402) of approximately 1-2 millimeters.

In one embodiment, any mechanical or electrical diaphragm may be used. For example, the diaphragm 320 may be a piezo electric diaphragm that is controlled by a controller or processor.

Figure 5:
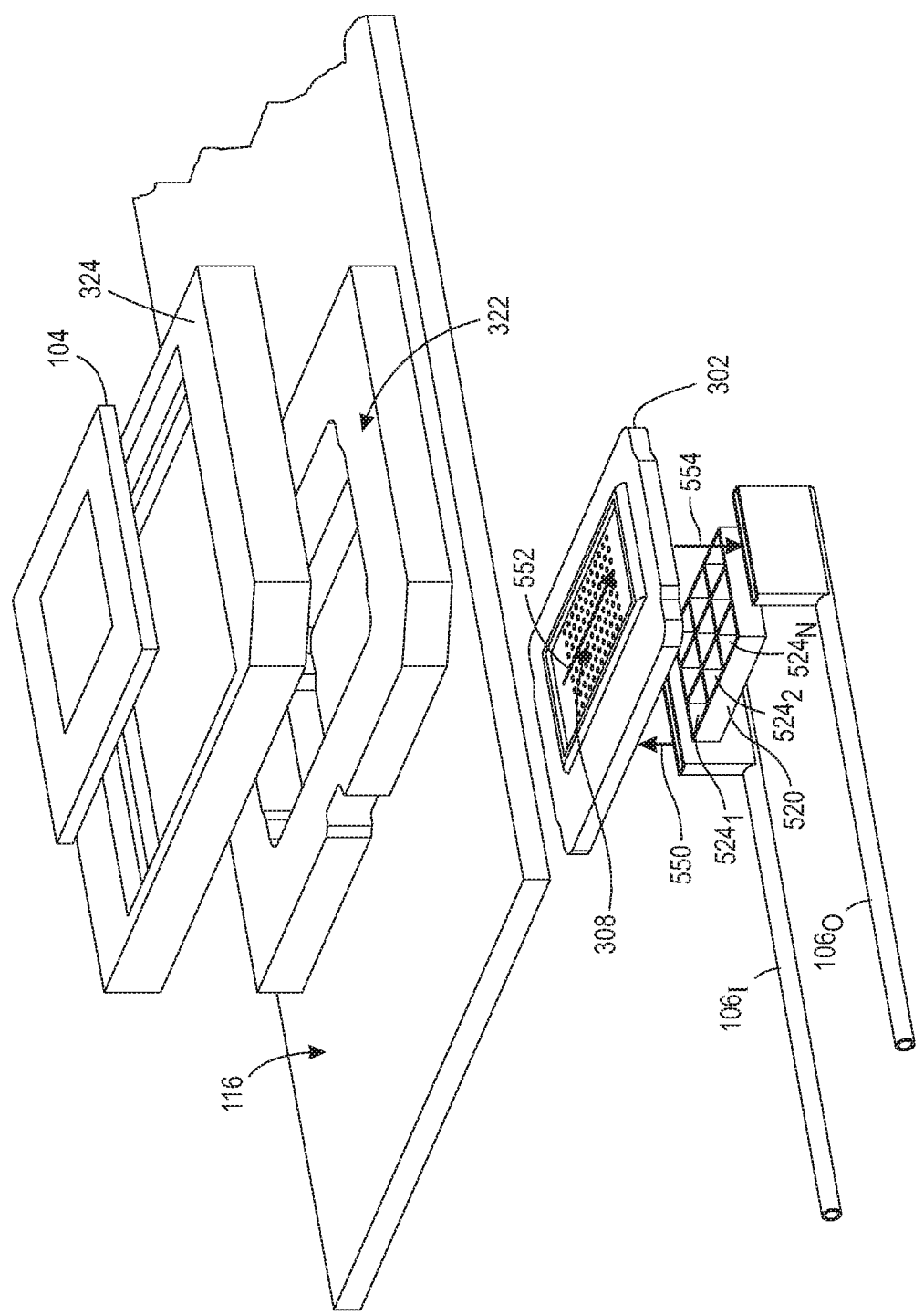
FIG. 5 illustrates an exploded view of an example diaphragm having a plurality of independent chambers of the present disclosure.

FIG. 5 illustrates an exploded view of another embodiment of a diaphragm 520 of the present disclosure. In one embodiment, airflow may move up onto the plate 302 as shown by an arrow 550, move across the plurality of holes 308 as shown by an arrow 552, and down into the cooling outlet $106_O$ as shown by an arrow 554.

In one embodiment, to further improve the heat transfer between the DMD 104 and of the airflow, the diaphragm 520 may include a plurality of independent chambers $524_1$ to $524_N$ (hereinafter referred to individually as an independent chamber 524 or collectively as independent chambers 524). In one embodiment, the chambers 524 may each have the same size, volume, dimensions, and the like. In another embodiment, the chambers 524 may have different sizes, volumes, dimensions, and the like, depending on a temperature profile of the DMD 104 and which surfaces of the DMD 104 are hotter or cooler.

In one embodiment, each one of the independent chambers 524 may include a respective movable floor 402. As a result, each independent chamber 524 may create a force that pushes different portions of the airflow up towards the housing 324 and the DMD 104. In one example, the respective movable floor 402 of each one of the independent chambers 524 may move at a same frequency at the same time. Thus, the airflow may move up and down similar to the airflow movement caused by the diaphragm 320.

In one embodiment, the respective movable floor 402 of each one of the independent chambers 524 may move at the same frequency but at different times. For example, the respective movable floor 402 of the independent chamber $524_1$ may be moving up as the respective movable floor 402 of the independent chamber $524_2$ is moving down. Thus, different portions (e.g., sub groups of the plurality of holes 308 that correspond to a particular independent chamber 524) of the airflow may move up and down at different points while moving across the plate 302.

In another embodiment, the respective movable floor 402 of each one of the independent chambers 524 may move at a different frequency at a different time. Thus, the respective movable floor 402 of the independent chamber $524_1$ may be oscillating at a frequency of 50 hertz and the respective movable floor 402 of the independent chamber $524_2$ may be oscillating at a frequency of 100 hertz, and so forth. In one embodiment, the frequency and timing of oscillation of the respective movable floor 402 of each one of the independent chambers 524 may be a function of a temperature profile of the DMD 104 and which surfaces of the DMD 104 are hotter or cooler.

In one embodiment, the diameter of the plurality holes 308 may also be different for different groups of holes that correspond to a particular independent chamber 524. For example, if less heat transfer is needed and the velocity of the synthetic jets can be lower, the holes that correspond to the independent chamber $524_1$ may be larger. In contrast, if more heat transfer is needed and the velocity of the synthetic jets should be higher, the holes that correspond to the independent chamber $524_2$ can be smaller, and so forth.

Figure 6:
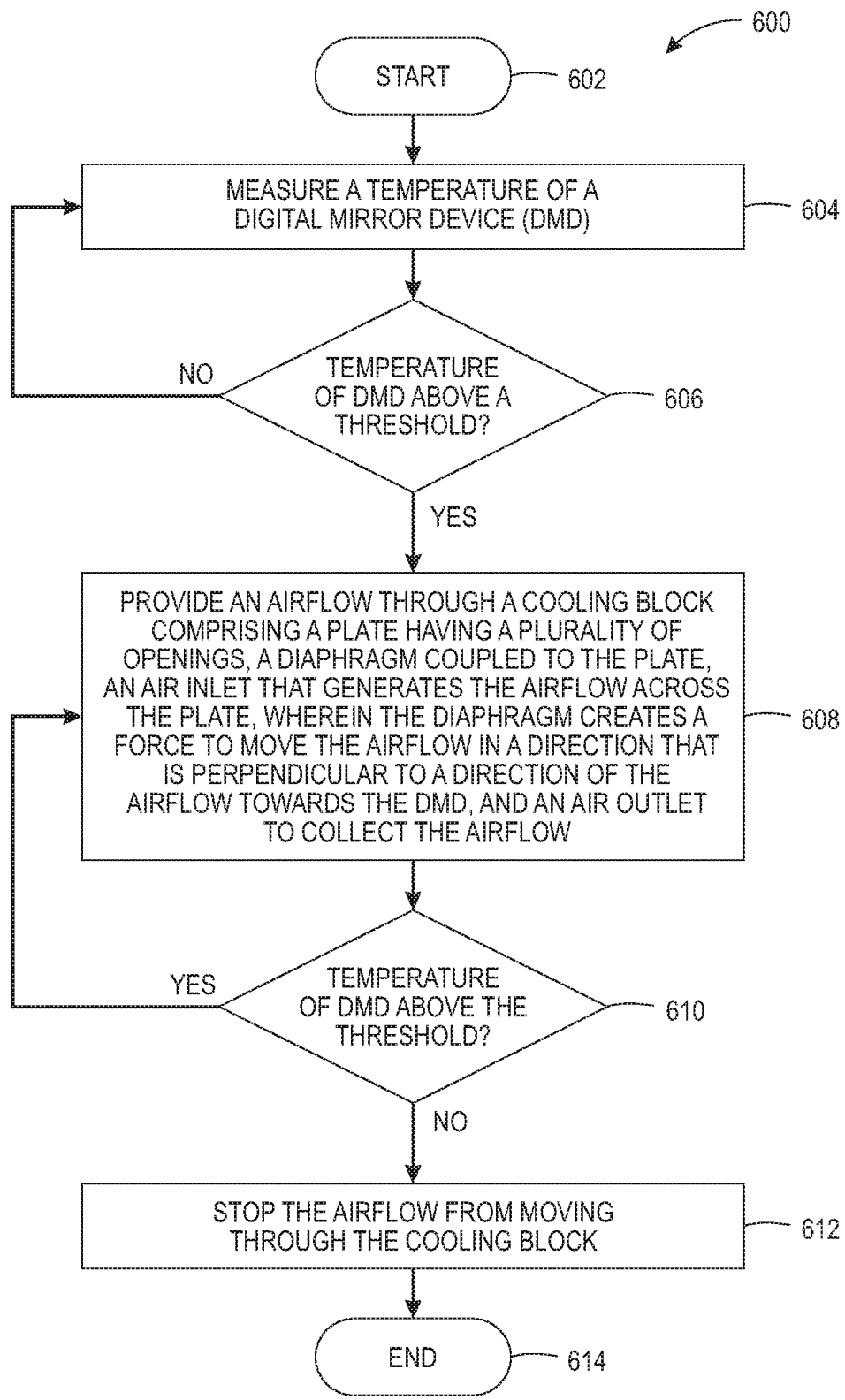
FIG. 6 illustrates a flowchart of an example method for cooling a digital mirror device.
Figure 7:
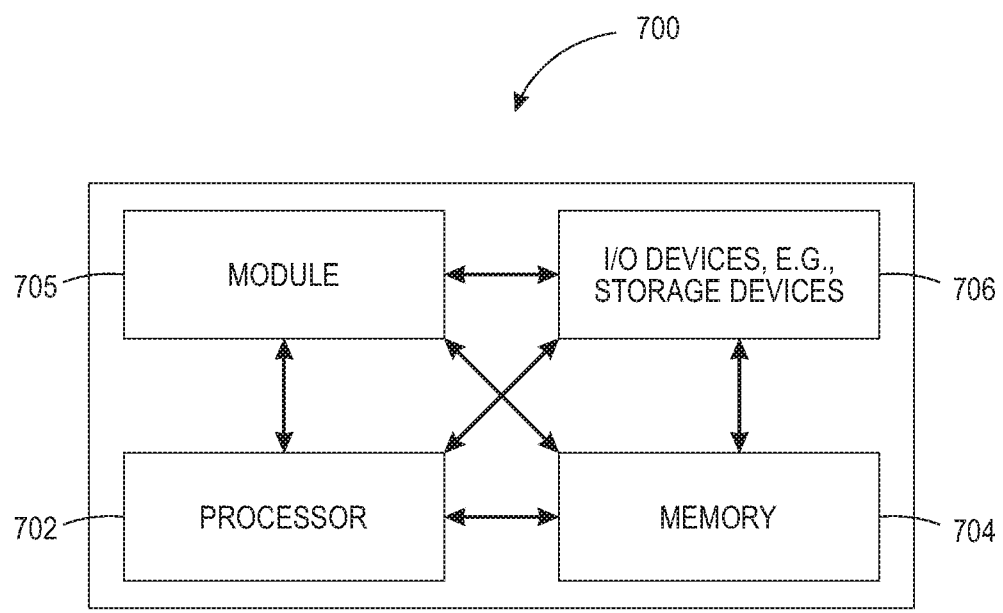
FIG. 7 illustrates a high-level block diagram of a computer suitable for use in performing the functions described herein.

FIG. 6 illustrates a flowchart of an example method 600 for cooling a digital mirror device. In one embodiment, one or more steps or operations of the method 600 may be performed by the LIM 100 or a computer that controls the LIM 100 as illustrated in FIG. 7 and discussed below.

At block 602, the method 600 begins. At block 604, the method 600 measures a temperature of the DMD. For example, the temperature sensing device may measure the temperature of the DMD.

At block 606, the method 600 determines if the temperature of the DMD is above a threshold. For example, the threshold may be a temperature that is associated with degradation of life or failure of the DMD. In one embodiment, the threshold may be 20° C.-30° C. However, the threshold temperature may be dependent on a location of the temperature sensing device and can vary based on the location and other environmental factors.

If the temperature is not above the threshold temperature, the method 600 may return to block 604 and continue monitoring the temperature of the DMD. However, if the temperature is above the threshold temperature, the method 600 may proceed to block 608.

At block 608, the method 600 may provide an airflow through a cooling block comprising a plate having a plurality of openings, a diaphragm coupled to the plate, an air inlet that generates the airflow across the plate, wherein the diaphragm creates a force to move the airflow in a direction that is perpendicular to a direction of the airflow towards the DMD, and an air outlet to collect the airflow. For example, as discussed above, the airflow may move across the plate at a velocity of approximately 0.5 m/s to 2.0 m/s.

In addition, to create more heat transfer, the airflow may be moved up towards the DMD and down away from the DMD in a wave form pattern as the airflow is moving across the plate. The up and down movement of the airflow may be caused by a force created by the diaphragm.

For example, diaphragm may have a movable floor that oscillates a particular frequency to push air through the plurality of holes of the plate to create synthetic jets. The movement of the synthetic jets may create the force that moves the airflow towards the DMD. As noted above, the frequency of oscillation of the movable floor may be a frequency between a range of approximately 30 hertz to 10 kilohertz.

In one embodiment, the diaphragm may have a plurality of independent chambers, with each independent chamber having a respective movable floor. Thus, the force may be created by the oscillation of the respective movable floor of each one of the plurality of independent chambers.

At optional block 610, the method 600 determines if the temperature of the DMD is above the threshold. For example, the temperature sensing device may continue to measure the temperature of the DMD. If the temperature of the DMD remains above the threshold, the method 600 may loop back to block 608 and continue to cool the DMD via the air that is delivered through the cooling block.

However, if the temperature of the DMD is below the threshold, the method 600 may continue to optional block 612. At optional block 612, the method 600 may stop the airflow from moving through the cooling block. At block 614, the method 600 ends.

In one embodiment, the method 600 may loop indefinitely from block 612 back to block 604. In other words, the method 600 may continuously measure the temperature of the DMD and cool the DMD via the airflow moved through the cooling block as long as the LIM is operating.

It should be noted that although not explicitly specified, one or more steps, functions, or operations of the method 600 described above may include a storing, displaying and/or outputting step as required for a particular application. In other words, any data, records, fields, and/or intermediate results discussed in the methods can be stored, displayed, and/or outputted to another device as required for a particular application. Furthermore, steps, blocks or operations in FIG. 6 that recite a determining operation or involve a decision do not necessarily require that both branches of the determining operation be practiced. In other words, one of the branches of the determining operation can be deemed as an optional step. In addition, one or more steps, blocks, functions or operations of the above described method 600 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

FIG. 7 depicts a high-level block diagram of a computer that is dedicated to perform the functions described herein. As depicted in FIG. 7, the computer 700 comprises one or more hardware processor elements 702 (e.g., a central processing unit (CPU), a microprocessor, or a multi-core processor), a memory 704, e.g., random access memory (RAM) and/or read only memory (ROM), a module 705 for cooling a digital mirror device, and various input/output devices 706 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 705 for cooling a digital mirror device (e.g., a software program comprising computer-executable instructions) can be loaded into memory 704 and executed by hardware processor element 702 to implement the steps, functions or operations as discussed above in connection with the example method 600. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 705 for cooling a digital mirror device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A laser imaging module (LIM), comprising:
   a digital micromirror device (DMD);
   a housing coupled to the DMD, wherein a first side of the housing is coupled to a bottom of the DMD; and
   a cooling block coupled to a second side of the housing that is opposite the first side, wherein the cooling block comprises:
      a plate comprising a plurality of openings;
      a diaphragm coupled to the plate;
      an air inlet to generate an airflow;
      an air outlet to collect the airflow; and
      a plurality of airflow guides, wherein the airflow moves across a top side of the plate inside of an enclosure formed by the air inlet, the air outlet, and the plurality of airflow guides, wherein a movable floor of the diaphragm moves towards a bottom side of the plate to force air out through the plurality of openings and move the airflow in a direction that is perpendicular to a direction of the airflow towards the second side of the housing.

2. The LIM of claim 1, wherein the
movable floor oscillates to create the force to move the airflow in the direction that is perpendicular to the direction of the airflow.

3. The LIM of claim 2, wherein the movable floor oscillates in between and including 1-2 millimeters in a direction towards and away the plate.

4. The LIM of claim 2, wherein the movable floor oscillates at a frequency in a range of in between and including 30 hertz to 10 kilohertz.

5. The LIM of claim 1, wherein the diaphragm comprises a piezo electric diaphragm.

6. The LIM of claim 1, wherein the diaphragm comprises:
a plurality of independent chambers, and each one of the plurality of independent chambers comprises a respective movable floor that oscillates.

7. The LIM of claim 6, wherein the respective movable floor for each one of the plurality of independent chambers may oscillate at a different time or a different frequency.

8. The LIM of claim 1, wherein the airflow is continuous.

9. The LIM of claim 1, wherein the airflow is moved at a velocity of in between and including 0.5 meters per second (m/s) to 2 m/s.

10. The LIM of claim 1, wherein the plurality of openings each comprise a diameter of in between and including 25 microns to 100 microns.

11. The LIM of claim 1, wherein the plate comprises airflow guides on opposite sides of the plate to contain the airflow over the plurality of openings of the plate.

12. The LIM of claim 1, wherein the plate is a rectangle and the air inlet is adjacent to a first end of the rectangle and the air outlet is adjacent to a second opposite end of the rectangle.

13. The LIM of claim 1, further comprising:
a temperature sensing device measure a temperature of the DMD.

14. A method for cooling a digital micromirror device (DMD), comprising:
measuring a temperature of the DMD;
determining that the temperature of the DMD is above a threshold; and
providing an airflow through a cooling block comprising a plate having a plurality of openings, a diaphragm coupled to the plate, an air inlet that generates the airflow, an air outlet to collect the airflow, and a plurality of airflow guides, wherein the airflow moves across a top side of the plate inside of an enclosure formed by the air inlet, the air outlet, and the plurality of airflow guides, wherein a movable floor of the diaphragm moves towards a bottom side of the plate to force air out through the plurality of openings and move the airflow in a direction that is perpendicular to a direction of the airflow towards the second side of the housing.

15. The method of claim 14, further comprising:
repeating the measuring until the temperature of the DMD is below the threshold; and
stopping the airflow from moving through the cooling block.

16. The method of claim 14, wherein the temperature is measured by a temperature sensing device coupled to the DMD and the cooling block.

17. The method of claim 14, wherein the diaphragm creates the force by oscillating a moving floor in the diaphragm at a frequency of in between and including 30 hertz to 10 kilohertz.

18. The method of claim 14, wherein the airflow is moved at a velocity of in between and including 0.5 meters per second (m/s) to 2 m/s.

19. A laser imaging module (LIM), comprising: a digital micromirror device (DMD);
a housing coupled to the DMD, wherein a first side of the housing is coupled to a bottom of the DMD;
a rectangular plate comprising a plurality of openings coupled to a second side of the housing that is opposite the first side;
an air inlet coupled to a first end of the rectangular plate to generate an airflow across the rectangular plate;
an air outlet coupled to a second end that is opposite the first end of the rectangular plate to collect the airflow;
a pair of airflow guides on a third end and a fourth end that is opposite the third end of the rectangular plate, wherein the air inlet, the air outlet and the pair of airflow guides form a chamber to contain the airflow that moves across a top side of the rectangular plate; and
a diaphragm coupled to a bottom side of the rectangular plate, wherein the diaphragm comprises a movable floor that moves towards a bottom side of the plate to creates force air out through the plurality of openings and to move the airflow in a direction towards a back side of the DMD, wherein the via-a movable floor that oscillates at a frequency of in between and including 30 hertz to 10 kilohertz.

20. The LIM of claim 19, wherein the diaphragm comprises:
a plurality of independent chambers, and each one of the plurality of independent chambers comprises a respective movable floor that oscillates.

* * * * *